May 5, 1936.    E. B. MORGAN    2,039,973
CLAMP
Filed Dec. 22, 1933
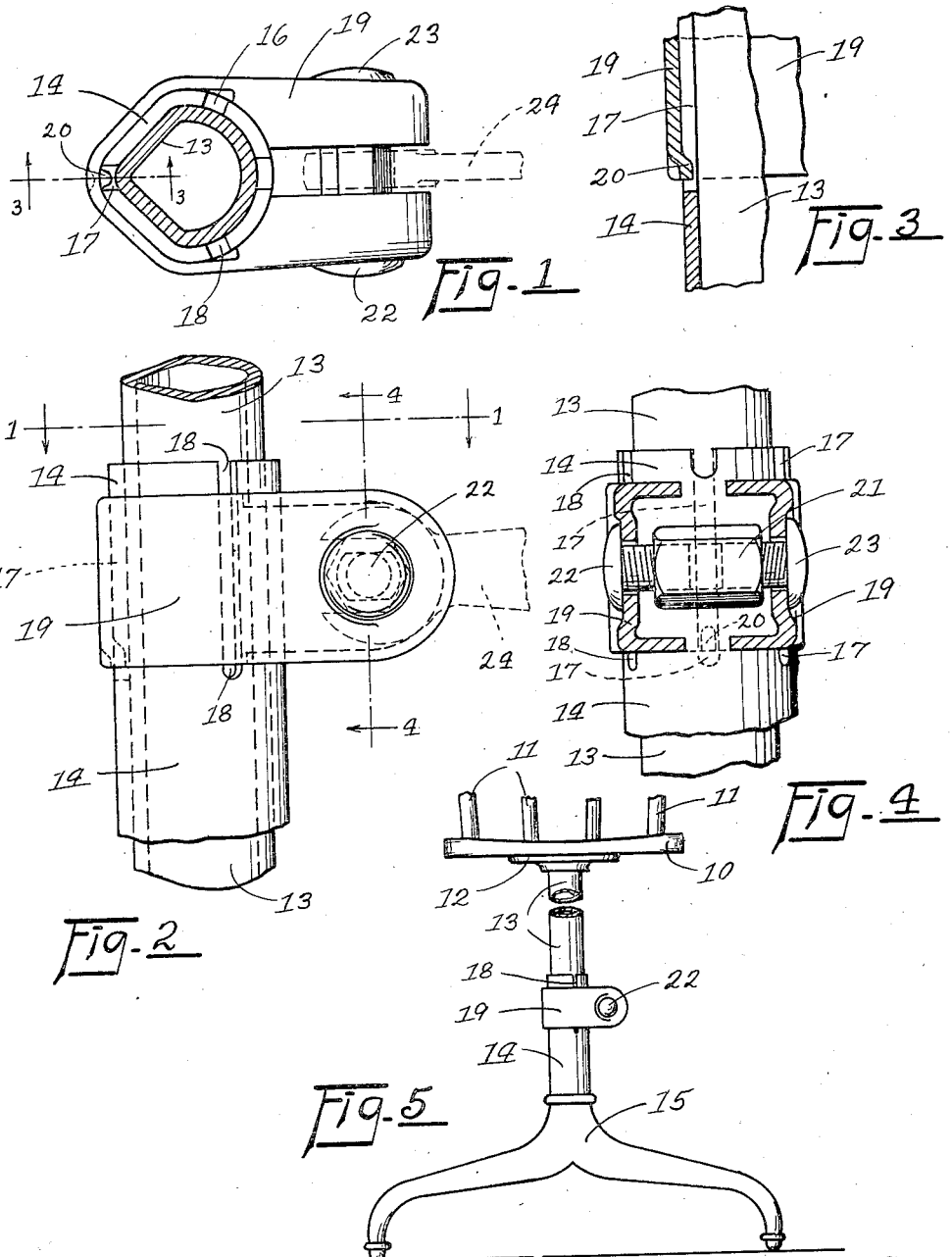
Witness:
Geo. L. Chapel
Inventor
Erving B. Morgan
By Rice and Rice
Attorneys Patented May 5, 1936

2,039,973

UNITED STATES PATENT OFFICE 2,039,973

CLAMP

Erving B. Morgan, Grand Rapids, Mich., assignor to American Seating Company, Grand Rapids, Mich., a corporation of New Jersey Application December 22, 1933, Serial No. 703,634

2 Claims. (Cl. 287—58)

The present invention relates to clamps and more particularly to clamps for maintaining a pair of telescopingly slidable members in longitudinally adjusted position.

The principal objects of the invention are to provide a clamp of the character above indicated; to provide such a clamp particularly adapted for use in conjunction with maintaining a seat for a school desk or the like at a predetermined or adjusted height from the floor and/or in relation to the desk; and, to provide such a clamp assembly which is convenient in use, which may be readily adjusted, which is not unattractive in appearance, and which is economical to manufacture.

An illustrative embodiment of the invention is shown in the accompanying drawing, wherein:

Figure 1 is a top plan sectional view of the clamp assembly on line 1—1 of Figure 2;

Figure 2 is an elevational view thereof;

Figure 3 is a sectional view on line 3—3 of Figure 1;

Figure 4 is a sectional view on line 4—4 of Figure 2; and

Figure 5 is a front elevational view of a seat such as used with school desks or the like supported by its base standard in vertically adjusted position by the clamp assembly of the instant invention.

Referring to the drawing in which like parts of the structure shown are designated by the same numerals in the several views, a seat 10 having a back 11 is secured to an annular flanged member 12 which is secured to the vertical pedestal member 13 here shown as of sheet metal tubing and triangular in cross section.

This vertical pedestal member 13 is telescopingly and slidably disposed within a tubular member 14 preferably of sheet metal which is similarly generally triangularly formed in cross section. The tubular member 14 is secured to its base standard 15 in any suitable manner and is provided at its upper end with a plurality of longitudinally disposed slots 16, 17, and 18 which extend inwardly from its upper end.

A flexible bifurcated clamp 19 likewise of sheet metal provided with a lug 20 formed or pressed from its wall and projecting into or engaging within the slot 17 slidably embraces the tubular member 14 as best shown in Figure 1 and a turnbuckle between the bifurcated ends of the clamp comprising the nut 21 whose bore is oppositely threaded at its respective ends engages the reversely threaded bolts 22, 23 for adjustably maintaining the members in longitudinally adjusted position. A wrench 24, indicated in dotted lines and of conventional type, may be employed in fixing the members in predetermined adjusted position.

It will thus be seen that a clamp assembly has been herein shown and described which is particularly adapted for use in conjunction with maintaining a seat for a school desk or the like at a predetermined or adjusted height from the floor and/or in relation to the desk and that the clamp is convenient in use, may be readily adjusted and is economical to manufacture.

While but one specific embodiment of this invention has been herein shown and described, it will be understood that numerous details of the construction shown may be altered or omitted without departing from the spirit of this invention as defined by the following claims.

I claim:

1. In combination, tubular members of generally triangular form, of which the inner member extends downwardly into the outer member and the upper end of the outer member has longitudinal slots whereby said upper end may be reduced to clampingly engage the inner member, and a split band clamp embracing the slotted upper end of the outer member, having a struck-up inwardly offset lug on its embracing portion and extending into one of the slots of the outer member to prevent downward sliding movement of the clamp beyond the lower ends of the slots of the outer member, clamping screws extending inwardly through the end portions of the clamp, and a turnbuckle sleeve between the end portions of the clamp and engaging the said clamping screws for regulating the tension of the clamp.

2. In combination, tubular members of which the inner member extends downwardly into the outer member and the upper end of the outer member has longitudinal slots whereby said upper end may be reduced to clampingly engage the inner member, and a split band clamp embracing the slotted upper end of the outer member, having a struck-up inwardly offset lug on its embracing portion and extending into one of the slots of the outer member to prevent downward sliding movement of the clamp beyond the lower ends of the slots of the outer member, clamping screws extending inwardly through the end portions of the clamp, and a turnbuckle sleeve between the end portions of the clamp and engaging the said clamping screws for regulating the tension of the clamp.

ERVING B. MORGAN.